J. V. M. RISBERG.
MANUFACTURE OF BUTTER.
APPLICATION FILED APR. 12, 1907.
908,887.
Patented Jan. 5, 1909.
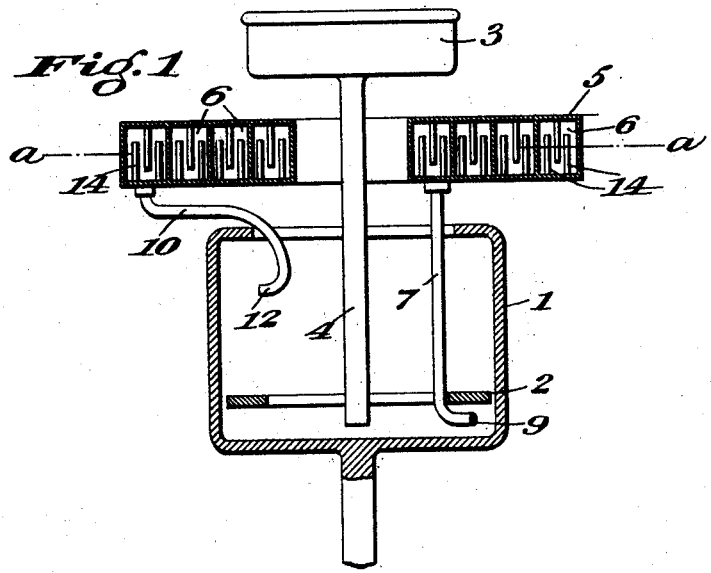
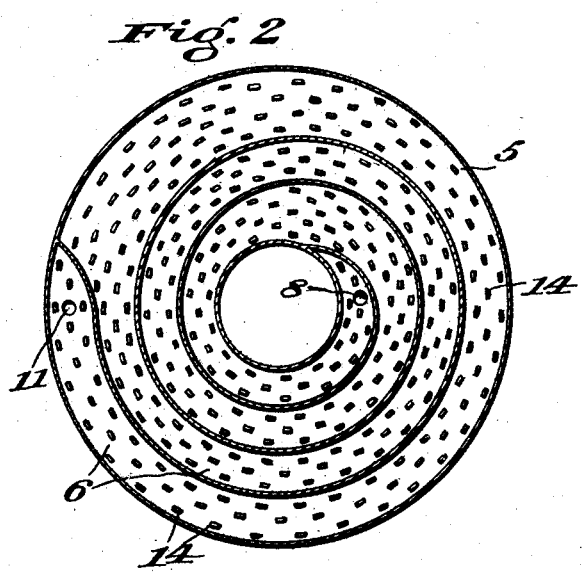
Attest:
Inventor:

UNITED STATES PATENT OFFICE.

JOHANNES VALDEMAR MÅRTEN RISBERG, OF SÖDERTELJE, SWEDEN, ASSIGNOR TO AKTIEBOLAGET BALTIC-SEPARATOR, OF STOCKHOLM, SWEDEN.

MANUFACTURE OF BUTTER.

No. 908,887.     Specification of Letters Patent.     Patented Jan. 5, 1909.

Application filed April 12, 1907. Serial No. 367,724.

*To all whom it may concern:*

Be it known that I, JOHANNES VALDEMAR MÅRTEN RISBERG, a subject of the King of Sweden, and a resident of Södertelje, in the Kingdom of Sweden, have invented certain Improvements in the Manufacture of Butter, of which the following is a specification.

The most generally known method of continuously manufacturing butter with the aid of centrifugal apparatus, commonly termed the "radiator method" is characterized by an extremely rapid and almost instantaneous formation of butter, whereas the formation of butter in ordinary churning processes and under similar conditions requires about ten minutes. This difference in the time required for the formation of the butter by the two processes is due to the especially forcible working or "beating" to which the cream is subjected in the "radiator method".

Despite the apparent advantage afforded by the continuous or "raditator method" in point of time required for the formation of the butter, however, this method presents material disadvantages due to the fact that the butter produced by it is of inferior quality by reason of being overworked and containing a great percentage of water, and to the fact that a great percentage of fatty substance remains in the churn-milk, whereby the yield of butter is lessened.

The present invention relates to a method of producing butter with the aid of a centrifugal apparatus similar to such as are employed according to the "radiator method", but with the aid of means for insuring a less rapid formation of the butter. An important feature of the improved process resides in subjecting the cream to a softened indirect working operation outside of the centrifugal drum, so that the production of butter, instead of being forced, as in the preceding method, is rendered more normal with a view to avoiding overworking and loss of the fatty substance.

In order that the improved method may be the better understood I have shown in the accompanying drawings an apparatus suitable for carrying the same into practical use, in which drawings—

Figure 1 is a vertical section taken axially through the said apparatus; and Fig. 2 is a sectional view taken transversely through the upper part of the apparatus in the plane indicated by the line *a—a* in Fig. 1.

The centrifugal drum 1 is rotated with great velocity, in a well known way, and cream is supplied thereto in a substantially continuous manner by way of the pipe 4, extended from the receptacle 3, so that said cream is exposed to the centrifugal action and is disposed in a cylindrical layer over the walls of the drum. The cream is stripped off at the lower part of the drum wall by the lower bent end portion or mouth 9 of a pipe 7, the mouth of said pipe being arranged below a ring or annular part 2 located near the bottom of the drum with its peripheral edge spaced at some distance from the side wall of the drum.

The cream entering the pipe 7 is forced upwardly therethrough outside of the centrifugal drum and through a casing 5 wherein is formed a churning channel through which the cream is caused to flow. This channel may have any form, but as shown in the drawing, said channel is made helical, as seen at 6, being formed by a helical partition vertically extended in the casing 5.

Projecting within the channel 6 are obstructions which, as herein shown, are in the nature of pins 14 with which the cream flowing through said channel is adapted to come into contact in such a manner as to effectively work the said cream. The pipe 7 is herein shown as communicating with the inner end of the helical channel 6, as shown at 8 in Fig. 2, so that the cream supplied to said channel is caused to traverse the same from its inner to its outer end, and at the said outer end of the channel 6 is arranged a discharge orifice 11, with which a pipe 10 communicates, said pipe 10 having its lower end bent downwardly so as to be adapted to discharge the worked cream into the centrifugal drum.

Having passed through the churning channel of the casing 5, the cream, together with the butter globules formed therein is led down through said pipe 10 and discharged from the bent end 12 thereof into the centrifugal drum, after which, since they are of lower specific weight, said butter globules will occupy a position nearest the center of the revolving cream layer in the drum, and will therefore be forced outwards over the top edge of the drum owing to the continuous manner in which the cream is supplied at the pipe 4.

That portion of the cream discharged from pipe 10 into the centrifugal drum which is not fully worked will, on the other hand, on account of its greater specific weight, force its way outwards through the revolving cream layer to a point near the wall of the centrifugal drum, at which point it descends, passing through the narrow space between the drum wall and the ring 2 in position to be again stripped off by the bent mouth of pipe 7, and again supplied through said pipe to the churning channel. In this way, it will be seen that the entire contents of the drum is passed through the churning channel in order that the cream may be properly worked therein without liability of too rapid formation of butter, and that part of the cream which after passing through said channel is not thoroughly worked therein is again returned thereto. The capacity of the churning channel will be preferably such as to permit the cream to be worked therein for a period of time, say about four minutes, sufficient to insure against excessive percentage of water and loss of the fatty substance.

Having thus described my invention, what I claim and desire to secure by Letters Patent is—

The method of continuously manufacturing butter characterized by the fact that the cream, led into a rotating drum, is drawn off by a stripping pipe and by the pressure thus effected is caused to pass through a stationary chamber or channel located outside the drum and provided with obstacles to the movement of the cream and of such capacity that the cream passes through the same at a reduced speed, so that a comparatively slow butter formation takes place, and after having passed through the said churning chamber, is returned into the drum so that parts of the cream which possibly are not already churned, are again forced through the churning chamber.

In witness whereof, I have hereunto signed my name in the presence of two subscribing witnesses.

JOHANNES VALDEMAR MÅRTEN RISBERG.

Witnesses:
CARL FRIBERG,
ROBERT APETGREN.